United States Patent [19]
Leopoldo et al.

[11] Patent Number: 5,863,569
[45] Date of Patent: Jan. 26, 1999

[54] APPARATUS FOR FORMING BELLINGS ON THERMOPLASTIC PIPES

[75] Inventors: Savioli Leopoldo, Alfonsine; Pezzi Lauro, Mezzano, both of Italy

[73] Assignee: S.I.C.A. Serrande, Infissi, Carpenteria, Attrezzatura S.p.A., Alfonsine, Italy

[21] Appl. No.: 832,304

[22] Filed: Apr. 3, 1997

[30] Foreign Application Priority Data

Apr. 9, 1996 [EP] European Pat. Off. .............. 96830201

[51] Int. Cl.⁶ .................................................. B29C 57/08
[52] U.S. Cl. ...................... 425/387.1; 425/392; 425/393; 425/DIG. 218
[58] Field of Search ................................ 425/384, 387.1, 425/392, 393, 403, DIG. 218, DIG. 242

[56] References Cited

U.S. PATENT DOCUMENTS

| 3,773,456 | 11/1973 | Salz et al. | 425/393 |
| 3,893,794 | 7/1975 | Acda | 425/393 |
| 3,899,280 | 8/1975 | Bailey et al. | 425/393 |
| 3,998,578 | 12/1976 | Acda | 425/393 |
| 4,266,926 | 5/1981 | Gordon | 425/387.1 |
| 4,277,231 | 7/1981 | Gordon | 425/387.1 |
| 4,625,383 | 12/1986 | Vassallo et al. | 425/393 |

FOREIGN PATENT DOCUMENTS

| 0092889 | 11/1983 | European Pat. Off. . |
| 0684124 | 11/1995 | European Pat. Off. . |
| 0700771 | 3/1996 | European Pat. Off. . |
| 2225123 | 12/1973 | Germany . |

OTHER PUBLICATIONS

Patent Abstracts of Japan, vol. 005, No. 076 (M–069), 20 May 1981.

Primary Examiner—James P. Mackey
Attorney, Agent, or Firm—Dvorak & Orum

[57] ABSTRACT

A tool for automatically forming on thermoplastic pipes, bellings of considerable longitudinal extension for sealingly joining pipes subject to high stresses. The tool includes a shaped spindle on which there is axially inserted a heated end of the thermoplastic pipe, and a first and second mechanical body that receives pressurized fluids which act on the pipe. The heated pipe end is plastically deformed in the region of the shaped portion of the spindle to form an annular seat and bell portion of the belling.

11 Claims, 1 Drawing Sheet

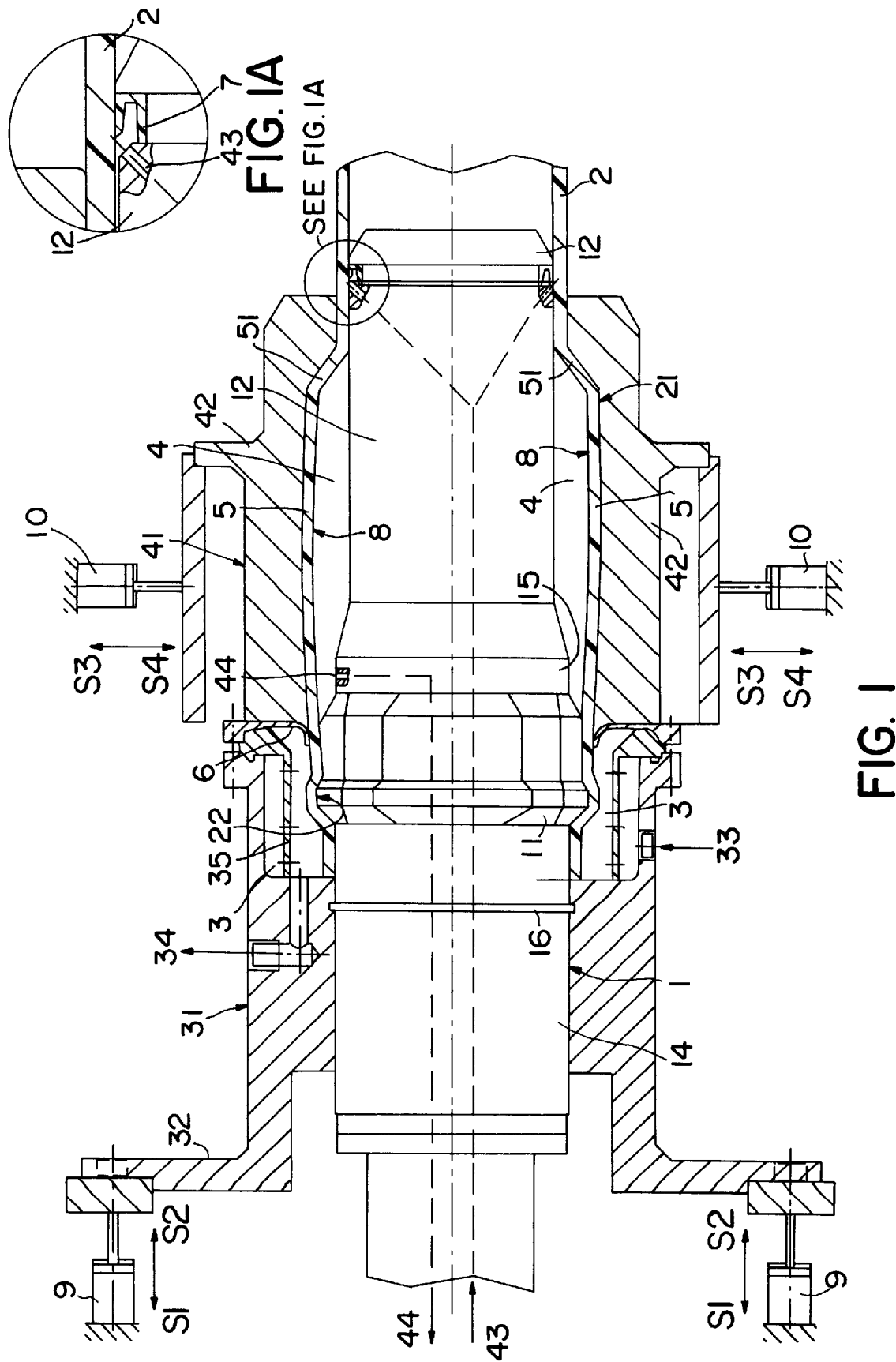

APPARATUS FOR FORMING BELLINGS ON THERMOPLASTIC PIPES

BACKGROUND OF THE INVENTION

The invention relates to a tool for automatically forming, on thermoplastic pipes, bellings of considerable longitudinal extension for sealingly joining pipes subject to high axial stresses. It comprises a spindle on which there is axially superimposed, by means of sliding, the heated end of a thermoplastic pipe which is deformed plastically in the region of a shaped portion of the spindle designed to define an annular seat for a sealing gasket of the pipe itself.

Tools are known for forming bellings on pipes made of thermoplastic material which comprise an internal annular seat designed to receive a ring or sealing gasket in the joint between two consecutive pipes, as well as a flaring or bell, located downstream of the said annular seat, designed to receive the end of the pipe connected to the pipe provided with the belling as described.

Within the range of such tools there are those which comprise a pressurized-air chamber which acts from the outside of the pipe so as to form both the annular seat and the bell, or so as to form the entire belling. In this case the spindle is provided with a shaped portion in relief, consisting of a ring of segments which can be expanded and retracted radially and which are designed to form the internal annular seat for the seal of the thermoplastic pipe which, at its front end, abuts against a heading flange surrounding there the spindle itself.

The spindle also has, downstream of the aforementioned shaped portion, a radial flaring which is designed to form the base of the belling and connect it to the remainder of the pipe, which is of nominal diameter.

In these cases therefore, the preheated end of the pipe must first be expanded radially along the radial flaring of the spindle and must then be expanded more extensively in the region of the expandable shaped portion. The latter is then retracted allowing removal of the pipe formed with its complete belling, obviously following cooling of the thermoformed part.

These bellings are particularly precise and have minimum tolerances even along the annular seat, even though the movement of mechanical parts occurs there, since this tool involves the action of a pressure which acts from the outside of the pipe towards a precise internal shaped portion, thereby ensuring perfect calibration internally. This obviously results in equally precise as well as stable and efficient positioning of the sealing gasket or ring of the belling.

However, there exists a significant drawback, due to the risk of the preheated pipe collapsing in the region of the zone where it undergoes the preliminary expansion, during its insertion onto the spindle. This risk of collapse is all the greater the longer the belling which one wishes to obtain. Consequently, there are precise limits as regards the length, which must be respected if damage to the belling is to be avoided.

In another known tool, on the other hand, a pressurized air chamber is provided, which acts from the inside, instead of from the outside of the pipe, so as to form the entire belling, including the annular seat. In this case there is provided a spindle which is shaped with a slight flaring so as to form the base of the belling and determine the diameter of the end of the belling itself. The spindle is also not provided with the expandable shaped portion which, in the preceding tool, was used to form the annular seat of the sealing ring. In this second tool the belling is in fact determined by the expansion of the preheated pipe section, against an external mold, against which the pressurized fluid acts. This outward expansion also takes place in order to form the annular seat for the seal. Basically, when the preheated pipe section is inserted onto the spindle during the initial phase, it does not encounter any particular obstacles or opposing forces while it is superimposed, by means of sliding, onto a spindle of this kind. Therefore, there is no risk of the pipe collapsing in this case. However, there is the obvious drawback due to the fact that the precision and the internal calibration of the belling is certainly not exceptional in such a case, since the mechanical abutment on the belling is located on the outside of the pipe and not, as in the preceding tool, inside the said pipe.

Therefore, with this second tool, it certainly would be possible to provide a belling which may be of any length, but not calibrated in a sufficiently precise manner as to guarantee subsequently the sealing action between successive pipes, especially if these joints were to be laid in sites which are subject to telluric movements or in any case are subject to intense axial deformations or stresses.

SUMMARY OF THE INVENTION

The object of the present invention is that of eliminating the drawbacks which characterize the known tools in cases where bellings of considerable longitudinal extension must be formed.

The technical task of the invention is therefore that of providing a tool for forming bellings of considerable longitudinal extension which at the same time are extremely precise in terms of their internal calibration, so as to allow a perfect sealing action also when combined with bellings of any longitudinal extension. Moreover, the apparatus in question also allows automatic cooling of the belling using the same means provided for forming it.

The mechanical construction of a tool of this kind is also particularly simple and effective. These objects are achieved by the invention in question, as characterized in the accompanying claims.

BRIEF DESCRIPTION of the DRAWINGS

Further characteristic features and advantages of the invention will emerge more clearly from the detailed description which follows, illustrated purely by way of a non-limiting example in the attached Figures where in: FIG. 1 shows the tool of the invention with some parts sectioned so that other parts can be seen more clearly, FIG. 1A is an expanded detailed view of the fluid inlet for the second annual chamber.

DESCRIPTION of the PREFERRED EMBODIMENTS

With reference to the accompanying drawing, the tool in question is provided with a spindle (1) which has an elongated end (12) with a diameter corresponding to the nominal diameter of the pipe (2) to be shaped, and a shaped portion (11) of the type comprising a ring of segments which can be mechanically expanded and radially retracted. When the segments are in the expanded condition, as shown in the figure, they constitute the shaped portion (11) for forming the annular seat (22). When they are in the retracted condition, they allow the shaped pipe to be removed from the tool.

The said spindle (1) is surrounded, in the region of its shank (14) and the shaped portion (11), by a first mechanical body (31) consisting of a heading flange (32) for the end section (23) of the pipe (2), while the remainder, in the region of the elongated end (12), is surrounded by a second mechanical body (41) consisting of two half-molds (42). In the region of the first mechanical body (31) there is formed at least a first annular chamber (3) which is located exclusively around the shaped portion (11) and supplied with a pressurized fluid acting from the outside of the pipe (2) towards the shaped portion (11).

On the other hand, in the region of the mechanical body (41) there is present a second annular chamber (4), which is therefore situated in succession with and upstream of the first chamber, it too being supplied with a pressurized fluid acting this time from the inside of the pipe (2) towards the external half-molds (42). While the first annular chamber (3) is used in order to ensure precise internal calibration of the annular seat (22) of the seal, the second chamber (4) is intended to form the belling (5) upstream of the said annular seat and as far as the base (51) of the belling itself. It is obvious that the longitudinal limits of the belling in this case are not applicable, since the latter is formed by means of exclusively localized expansion in the region of the shaped portion (11) or in any case in the vicinity thereof, even when modest flarings (15) of the type shown in the figure are present. Basically, the expansion which the pipe (2) will be subject to is in any case limited to sections which are short and hence such as to avoid any risk of the pipe collapsing even in the case of very long bellings. It should also be noted that the flaring (15) would not be necessary if the shaped portion (11) were to remain in the expanded condition while the pipe is gradually superimposed by means of sliding, in the region of the shaped portion (11) itself Elimination of the flaring (15), where performed, will obviously result in a different slope for the shaped portion (11) on the side where the elongated end (12) is situated.

As can be noted, the flange (32) is associated with the spindle by means of a seal (16) designed to ensure the sealing action on the side where the end section of the pipe (2) is situated and is movable in opposite directions (S1 and S2), axially with respect to the spindle. The half-molds (42), on the other hand, are movable in the two opposite directions (S3 and S4), transversely with respect to the axis of the spindle (1), so as to allow obviously removal of the belling once it has been formed. Each half-mold (42) has an internal cavity (8), preferably slightly flared towards the base (51) of the belling, which determines the geometric shape of the latter. This flaring would be useful for allowing freer oscillations of the connected pipe inside the belling (5).

Since the plastic deformation for formation of the belling must be followed by cooling of the belling itself, it is advantageous if the pressurized fluid used in the aforementioned chambers is in dynamic movement, passing continuously inside the chambers (3 and 4), while maintaining the desired pressure necessary for the plastic deformations to be obtained. In particular, the chamber (3) has inside it an inlet (33) and an outlet (34) for the pressurized fluid so that a pressurized fluid continuously flows inside the chamber (3).

When said fluid is cooled, obviously there is efficient cooling inside the chamber itself and hence of the zone corresponding to the shaped portion (11) where the annular seat (22) of the belling is formed. The same is also valid for the chamber (4), where there is a corresponding inlet (43) and an outlet (44) with a localized path inside the spindle (11).

The inlet for the pressurized fluid into the second chamber (4) is shown more clearly in the encircled detail of FIG. 1A, where it can be noted that the pressurized fluid passes through in the region of a lip seal (7), located at the end of the elongated head (12), so as to increase its sealing action with the entry of the pressurized fluid. The fluid itself will pass though the narrow interstice formed between the elongated end (12) of the spindle (1) and the external pipe, so as to then cause the said pipe to expand towards and against the internal cavities (8) of the molds, as is clearly shown in the Figure. The discharge hole (44) may be formed at any point on the spindle (1), provided that it is then led back towards the outside, ensuring a continuous cycle of dynamic movement of the fluid.

The chamber (3) is substantially delimited internally by the thermoplastic pipe and externally by the flange (32) which has, at the front, a seal (6) resting on the underlying pipe, in abutment with the half-molds (42), so as to effectively oppose the pressurized fluid, obviously for the purposes of the sealing action.

This seal (6) is preferably curved towards the inside of the chamber (3) and the half-molds (42) are correspondingly shaped. Since it is in any case extremely important for the annular seat (22) to be formed as precisely as possible, a diffuser (35) is also provided, being designed to distribute the pressurized fluid in an optimum manner from the outside of the pipe towards the underlying shaped portion (11).

The chamber (4) is similarly delimited internally by the thermoplastic pipe and externally by the cavity (8). The sealing action is ensured by the lip seal (7) and, on the opposite side, by the pressure in the opposite direction present inside the said first chamber (3), which ensures prefect adherence of the pipe to the underlying spindle (1).

When the belling thus described has been completed, actuator means (9) will be operated so as to displace, in the direction (S1), the flange (32), and similar actuator means (10) will be operated, in the opposite directions (S3 and S4), so as to open the half-molds (42), while the segments forming the shaped portion (11) will be retracted radially, thus allowing the belling to be easily extracted from the tool thus described. Obviously, the actuator means (9) will act in the opposite direction (S2), when another pipe has been inserted, so as to isolate the chamber (3) and cooperate with the molds (42), which have been closed beforehand in the direction opposite to the opening direction.

What is claimed:

1. A tool for automatically forming longitudinally extending bellings on thermoplastic pipes having outside and inside surfaces, said bellings for sealingly joining at least two pipes together, each of said bellings defined by a bell portion and an annular seat, said tool comprising:

a spindle having a shaped portion that is adapted to receive an open pipe end thereon and to define said annular seat of the pipe belling;

a first mechanical body positioned around said spindle, said first mechanical body including a first annular chamber formed therein and located exclusively around said shaped portion of the spindle;

a first means for supplying said first annular chamber with a pressurized flowing fluid, said pressurized fluid for acting on the outside surface of a pipe when said pipe is slid over said shaped portion so as to plastically deform a pipe end and create therein said annular seat;

a second mechanical body for positioning around the pipe and having a second annular chamber formed therein, said second mechanical body in abutment with said first mechanical body, a longitudinal dimension of said second annular chamber directly related to the longitudinal extension of the bell portion of the belling;

a second means for supplying said second annular chamber with a second pressurized flowing fluid, said second pressurized fluid for acting upon an inside surface of a pipe when a pipe is slid over said spindle, so as to plastically deform and create therein the bell portion of said belling.

2. The tool according to claim 1, wherein said first mechanical body includes a heading flange encompassing an end section of the pipe, and axially movable with respect to the spindle, while said second mechanical body comprises two half-molds located downstream of the flange and radially movable with respect to the axis of the spindle.

3. The tool according to claim 1, wherein the spindle includes an elongated end having an outside diameter corresponding to a nominal diameter of a pipe to be formed, the elongated end sealing the second annular chamber in a part of the pipe outward of said second mechanical body.

4. The tool according to claim 1, wherein each respective fluid supply means includes respective inlets and outlets to provide continuous fluid flow which cools the bell and the annular seat.

5. The tool according to claim 2, wherein the first chamber is fluidly sealed by an annular seal in abutment with the half-molds and the first mechanical body, said seal also positioned therebetween to contact an outside pipe surface when a pipe is slid over said spindle.

6. The tool according to claim 1, wherein said first chamber includes a diffuser to evenly distribute the pressurized fluid therein.

7. The tool according to claim 3, wherein one end of the second chamber is sealed by a lip seal located at an end of the elongated end of the spindle, while the other end of the chamber is sealed by the first pressurized fluid present inside the said first chamber, which causes adherence of a pipe to be formed to the spindle.

8. The tool according to claim 2, wherein each half-mold includes a respective internal cavity which said respective cavities define the second annular chamber which determines a geometric shape of the belling.

9. The tool according to claim 5, wherein the seal is curved towards an inside of the first chamber and wherein an end face of the half-molds are correspondingly shaped to accept the seal.

10. The tool according to claim 2, wherein the spindle includes an elongated end having an outside diameter corresponding to a nominal diameter of a pipe to be formed, the elongated end sealing the second annular chamber in a part of the pipe outward of said second mechanical body.

11. The tool according to claim 2, wherein each respective fluid supply means includes respective inlets and outlets to provide continuous fluid flow which cools the bell and the annular seat.

* * * * *